(12) United States Patent
Mock

(10) Patent No.: US 7,994,672 B2
(45) Date of Patent: Aug. 9, 2011

(54) LIMITED ANGLE EXTERNAL ROTOR MOTOR ACTUATOR SYSTEM

(75) Inventor: M. Robert Mock, Midway, UT (US)

(73) Assignee: Woodward HRT, Inc., Santa Clarita, CA (US)

( * ) Notice: Subject to any disclaimer, the term of this patent is extended or adjusted under 35 U.S.C. 154(b) by 269 days.

(21) Appl. No.: 12/346,357

(22) Filed: Dec. 30, 2008

(65) Prior Publication Data

US 2010/0164311 A1 Jul. 1, 2010

(51) Int. Cl.
*H02K 7/10* (2006.01)
*H02K 49/00* (2006.01)
*H02K 7/06* (2006.01)

(52) U.S. Cl. ............. 310/96; 310/36; 310/37; 310/38; 310/39; 310/83; 310/116; 74/10.9

(58) Field of Classification Search ............. 310/36, 310/37, 38, 39, 96, 83, 116; 74/20, 22 A, 74/63, 65; *H02K 7/06, 7/10, 15/10, 49/10*
See application file for complete search history.

(56) References Cited

U.S. PATENT DOCUMENTS

| | | | | | |
|---|---|---|---|---|---|
| 2,789,411 | A | * | 4/1957 | Ensign et al. | 368/128 |
| 3,964,367 | A | * | 6/1976 | Stoferle et al. | 409/131 |
| 4,398,167 | A | * | 8/1983 | Dickie et al. | 335/272 |
| 4,496,887 | A | * | 1/1985 | Ichihara et al. | 318/400.41 |
| 4,704,567 | A | * | 11/1987 | Suzuki et al. | 318/400.41 |
| 5,053,655 | A | * | 10/1991 | Benschop et al. | 310/15 |
| 5,979,254 | A | * | 11/1999 | Blanchet et al. | 74/42 |
| 6,448,673 | B1 | | 9/2002 | Brown et al. | |
| 6,476,526 | B1 | * | 11/2002 | Hsieh | 310/68 B |
| 6,481,415 | B1 | | 11/2002 | Cook | |
| 6,762,575 | B2 | | 7/2004 | Douglas | |
| 7,156,217 | B2 | | 1/2007 | Raber | |
| 7,262,569 | B2 | | 8/2007 | Douglas | |
| 2003/0136930 | A1 | * | 7/2003 | Dowden et al. | 251/129.11 |
| 2005/0121989 | A1 | * | 6/2005 | Suzuki | 310/156.06 |
| 2010/0164311 | A1 | * | 7/2010 | Mock | 310/83 |

FOREIGN PATENT DOCUMENTS

FR 2756660 A1 6/1998

OTHER PUBLICATIONS

Fleisher, William A., "Brushless Motors for Limited Rotation," Machine Design, vol. 61, No. 25, Dec. 7, 1989, pp. 97-100.

* cited by examiner

*Primary Examiner* — Quyen Leung
*Assistant Examiner* — John K Kim
(74) *Attorney, Agent, or Firm* — BainwoodHuang

(57) ABSTRACT

The actuator system has a external rotor motor having: (i) an internal armature configured as a stator having a set of coils wrapped around a set of arms, and (ii) an external permanent magnet rotor having a set of poles configured to rotate less than 90 degrees around the stator. The actuator system has a drive shaft configured to be rotated by the external rotor motor. The actuator system has a drive train connecting the external permanent magnet rotor to the drive shaft, and configured to provide gear ratio to the drive shaft.

15 Claims, 8 Drawing Sheets

LIMITED ANGLE EXTERNAL ROTOR MOTOR ACTUATOR SYSTEM

BACKGROUND

Electro mechanical actuators (EMAs) are used to allow mechanical devices to achieve motion such as rotational motion and linear motion. Applications for EMAs that produce rotational motion include servoactuators, valve actuators, and flight controls. These types of EMAs are typically driven by electric motors and utilize power trains to deliver mechanical advantage. Typically a high gear ratio (e.g., 5:1 or higher) is required to deliver adequate performance at a reasonable cost for a particular application. The high gear ratio means that multiple rotations of the motor are required to achieve the desired range of motion. EMAs that produce linear motion include solenoids, linear motors, and voice coil motors. EMAs of this kind are often driven in a direct drive mode.

A typical rotational motion EMA used for flight control (e.g., a flight control EMA used to pivot the fins of a missile) consists of an internal rotor motor (an internal rotor is used to minimize system inertia) and a power train (to provide the desired gear ratio).

SUMMARY

Unfortunately there are deficiencies to the above-described conventional approaches to using a typical rotational motion EMA for achieving limited angle actuation. For example, EMAs with high gear ratios are relatively slow. This relatively slow speed is due to the fact that the motor must travel through a much larger input angle than is traveled by an output angle (e.g., an EMA with 10:1 gear ratio will have a motor rotate 600 degrees to produce only 60 degrees of motion for the system).

Another deficiency to the above-described conventional approaches to using a typical rotational motion EMA for achieving limited angle actuation is that the speed of response (for example, the frequency response) is necessarily slow because of the high gear ratio.

Yet another deficiency to the above-described conventional approaches to using a typical rotational motion EMA for achieving limited angle actuation is that typical rotational motion EMAs are complex devices. EMAs typically utilize commutation to switch the electric current running through the motor coils. Controlled commutation requires multiple additional wires and switches which make EMAs more complex and more expensive to produce. Furthermore the gear train (e.g., drive gears and screws) are typically required to be precise and have relatively complex configurations.

In contrast to the above-identified conventional approaches to using a typical rotational motion EMA for achieving limited angle actuation, an improved actuator design involves using an external rotor motor to rotate a shaft attached to the motor using a simple drive train made of pins and links. A motor with an external rotor can provide greater torque than an internal rotor motor of a similar size. This higher torque reduces the need for high gear ratios which tend to slow the effective speed of actuators. Due to the motor's limited travel, less than 90 degrees, and its magnet and stator design the motor requires no commutation. This makes the actuator less complicated, less expensive and more compact.

One embodiment is directed to an actuator system. The actuator system has an external rotor motor having: (i) an internal armature configured as a stator having a set of coils wrapped around a set of teeth, and (ii) an external permanent magnet rotor having a set of poles configured to rotate less than 90 degrees around the stator. The actuator system has a drive shaft configured to be rotated by the external rotor motor. The actuator system has a drive train connecting the external permanent magnet rotor to the drive shaft, and configured to allow transmission of a first component of rotational motion (for example, the tangential component) from the external permanent magnet rotor to the drive shaft and to prevent transmission of a second component of rotational motion (for example, the radial component) from the external permanent magnet rotor to the drive shaft, the first component of rotational motion being perpendicular to the second component of rotational motion.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved device for achieving limited angle rotation in high speed and low torque environments employs an external rotor motor to oscillate quickly in a limited angle of the motor and to act through a simple drive train to rotate a drive shaft. Accordingly, the external rotor allows the motor to be smaller, cheaper, faster, and less complex than a motor with an internal rotor that achieves the same capabilities.

Figure 1:
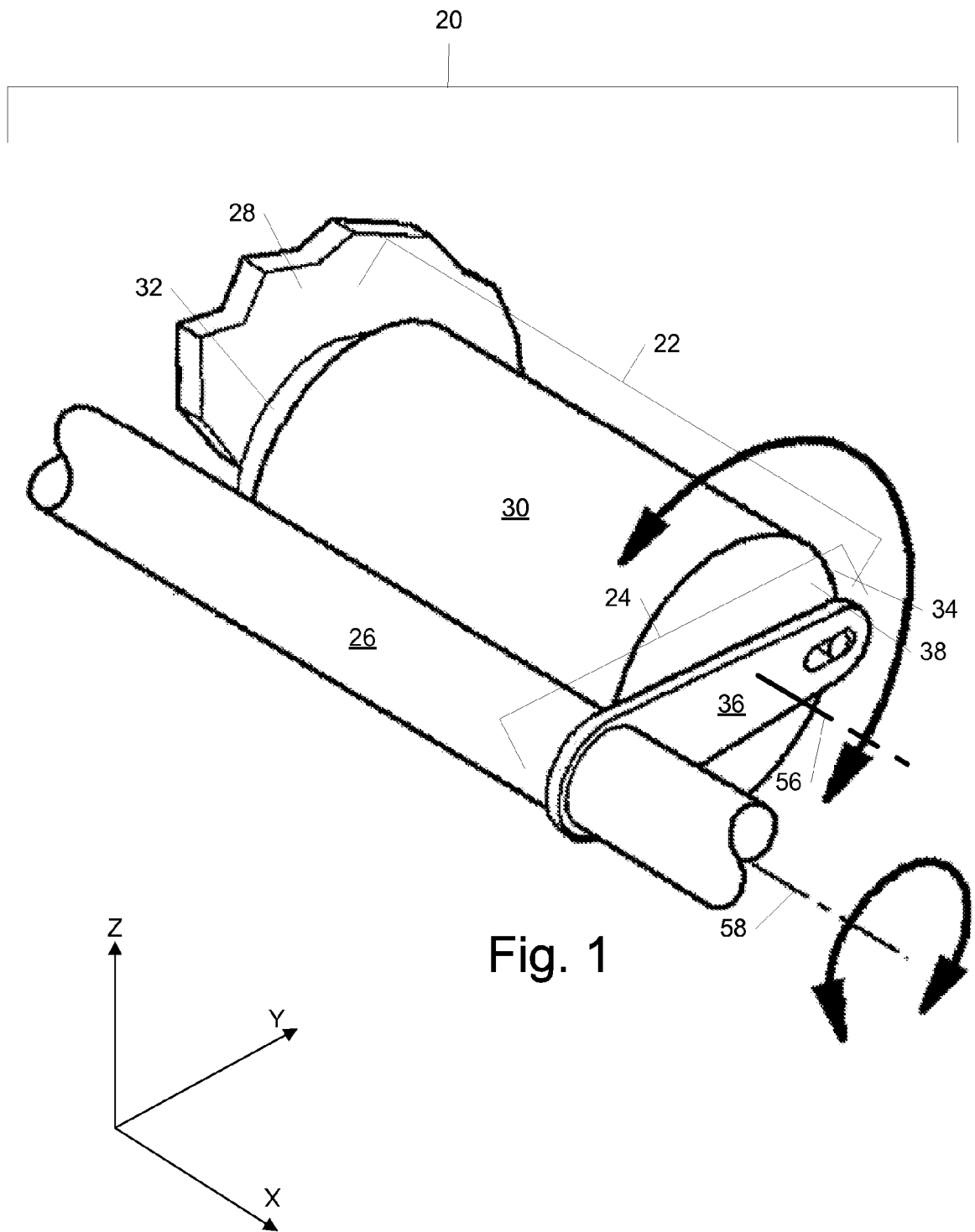
FIG. 1 is a perspective view of a first embodiment of an actuator system having an external rotor motor, a drive shaft and a drive train.

FIG. 1 shows a first embodiment of an actuator system 20 which includes an external rotor motor 22, a drive train 24, a drive shaft 26 and a chassis 28. The external rotor motor 22 includes an external rotor 30, an internal stator 32 and a motor pin 34. The drive train 24 includes a crank arm 36 and a crank arm slot 38.

In a general sense, the drive train 24 is configured to allow transmission of a first component of rotational motion from the external rotor 30 (i.e., external permanent magnet rotor) to the drive shaft 26 and to prevent transmission of a second component of rotational motion from the external rotor to 30 the drive shaft 26. Relative to the axis of the drive shaft 26 the first component of rotational motion is perpendicular to the second component of rotational motion.

As seen in FIG. 1, the external rotor motor 22 is rigidly attached to the chassis 28 (e.g., structural member of a missile). This rigid attachment is made to the stationary internal stator 32 of the external rotor motor 22. The external rotor 30 of the external rotor motor 22 rotates freely with respect to the chassis 28 along a first axis of rotation 56 which is parallel to the X axis. The rotation of the external rotor 30 is restricted to a limited angle rotation (e.g. less than 90 degrees). Due to the external rotor's 30 limited rotation and the 4-pole configuration of the stator and the magnets, commutation is not required to control operation of the motor.

The drive shaft 26 rotates about a second axis of rotation 58 that is parallel to the X axis. Other than this rotation, the motion of the drive shaft 26 restrained. The rotation of the drive shaft 26 provides motion for other devices not shown (e.g., fins of a missile). For example, a missile fin could be directly affixed to the drive shaft 26. As the drive shaft 26 rotates, the missile fin also rotates.

The first embodiment of the actuator system 20 utilizes a single link, two dimensional (2D) version of the drive train 24. The drive train 24 is a single link version, because the only link used is the crank arm 36. The drive train 24 is considered 2D because the motion of the link (e.g., crank arm 36) is restricted to a 2D plane (e.g., Y-Z plane).

As seen in FIG. 1, the motor pin 34 extends from a location at some radius from the axis 56 on the end surface of the external rotor 30 (the end surface is the only portion of the external rotor 30 depicted in a plane perpendicular to the X direction). The motor pin 34 interacts with the drive train 24. The single link 2D version of the drive train 24 incorporates the crank arm 36 and the crank arm slot 38 to transmit rotation of the external rotor 30 to the drive shaft 26. The motor pin 34 inserts into the crank arm slot 38 on one end of the crank arm 36. The drive shaft 26 affixes to the other end of the crank arm 36. As will be discussed in further detail below with reference to FIG. 2, this single link 2D version of the drive train 24 transmits a portion of the motor's 22 rotation to the drive shaft 26 in the same direction and perpendicular to the X direction.

Figure 2A:
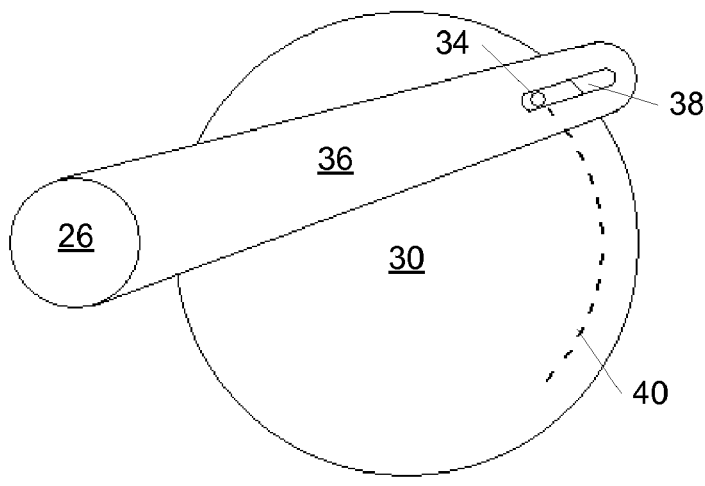
FIGS. 2A, 2B, and 2C are side views of the actuator system of FIG. 1.
Figure 2B:
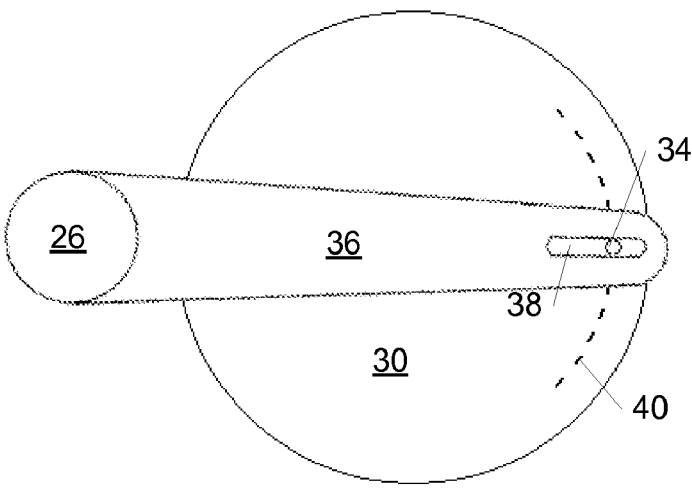
Figure 2C:
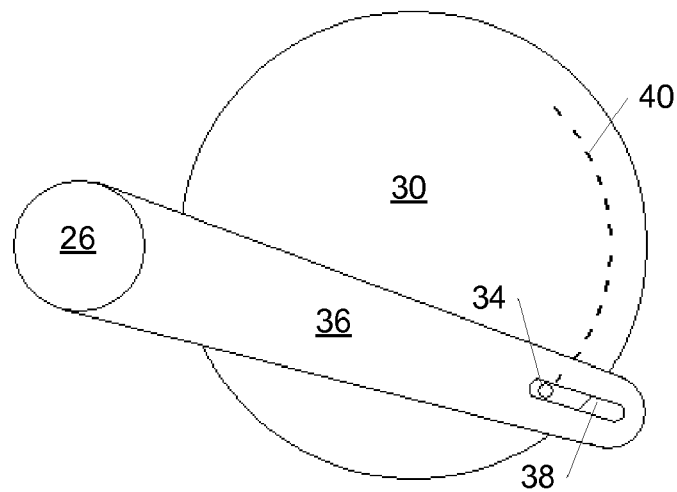

FIG. 2A shows the external rotor 30 with the motor pin 34 in the maximum counterclockwise position (maximum Z position of FIG. 2A, B, or C) and shows a range of motion 40 of the motor pin 34. FIG. 2B shows the external rotor 30 with the motor pin 34 in the midpoint position (intermediate Z position of FIG. 2A, B, or C) and shows the range of motion 40 of the motor pin 34. FIG. 2C shows the external rotor 30 with the motor pin 34 in the maximum clockwise position (minimum Z position of FIG. 2A, B, or C) and shows the range of motion 40 of the motor pin 34.

Because the external rotor 30 and the drive shaft 26 are restrained except with respect to rotation about the X direction, as the motor pin 34 moves about the first axis of rotation 56, the end of the crank arm 36 not attached to the drive shaft 26 is swept through an arc in a Y-Z plane. The motion of the crank arm 36 applies a torque to the drive shaft 26, causing the drive shaft 26 to rotate. As shown, the motor pin 34 also moves radially across the crank arm slot 38 during the external motor rotor 22 rotation. Thus the motor pin 34 transmits motion to the drive shaft 26 that is solely perpendicular to the crank arm 36 (and not radially). An angular change in the external rotor 30 will result in an angular change in the drive shaft 26, but since the range of angular displacement of the external rotor 30 is larger than the range of angular displacement of the drive shaft there will be a mechanical advantage essentially proportional to the ratio of these two angular displacement ranges. (i.e. the change in the angle of the drive shaft 26 about the second axis of rotation 58 will be less than the change in the angle of the external rotor 30 about the first axis of rotation 56, and the difference of angular displacement will be a function of the radial location of the pin 34 and the length of the crank arm 36).

As seen in FIG. 2A, since the motor pin 34 is in the maximum counterclockwise position of its range of motion 40, the motor pin 34 occupies a minimum Y position of the crank arm slot 38. As the motor pin 34 moves in the clockwise direction with respect to the first axis of rotation 56 to the midpoint position of the range of motion 40, as seen in FIG. 2B, the motor pin 34 drags the end of the crank arm 36 in a clockwise arc about the axis of the drive shaft 26 and moves to the maximum Y position of the crank arm slot 38. Finally, as the motor pin 34 moves in the clockwise direction to the maximum clockwise position of the range of motion 40, as seen in FIG. 2C, the motor pin 34 drags the end of the crank arm 36 further to its most clockwise position and moves back to the minimum Y position of the crank arm slot 38.

Figure 3:
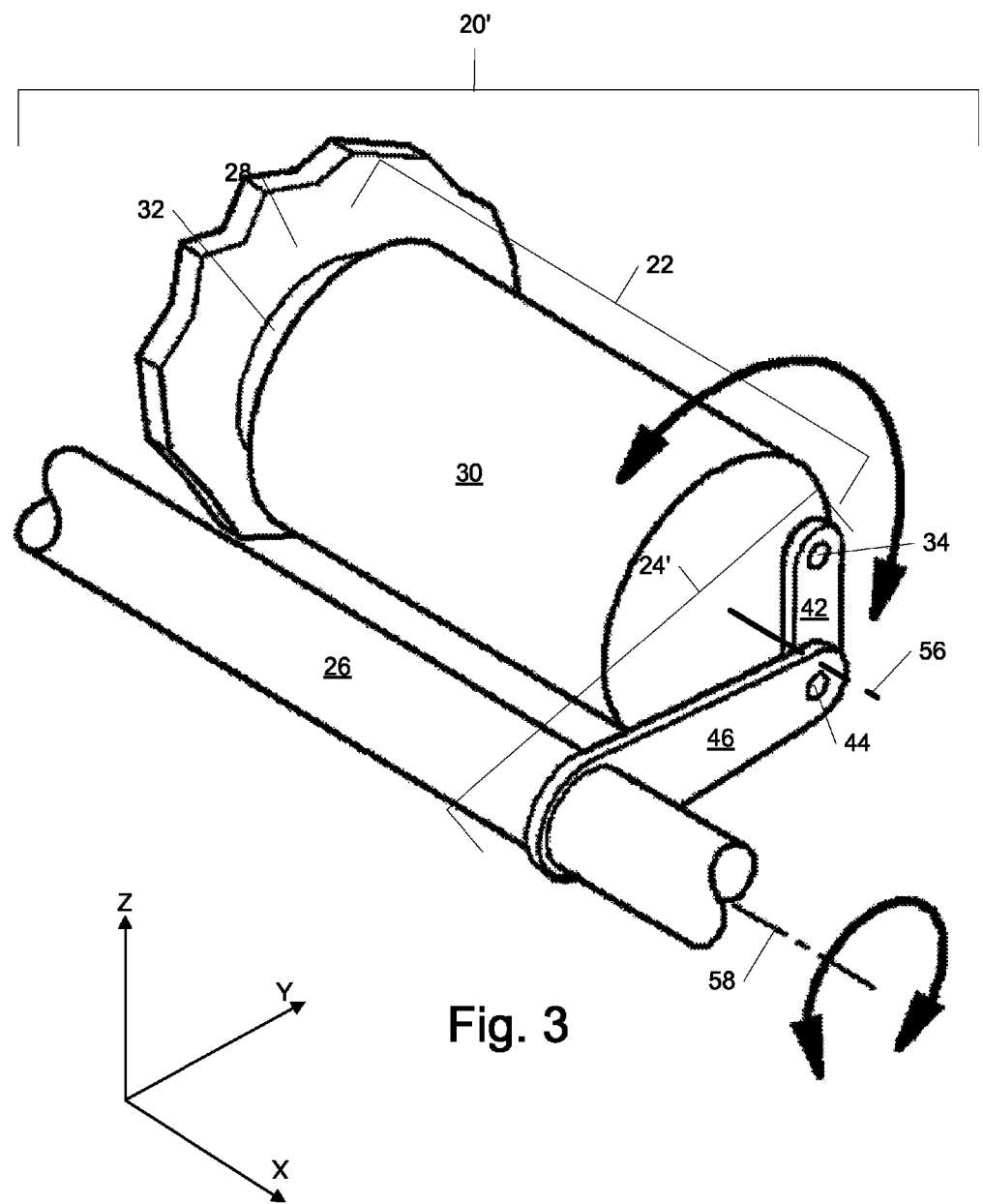
FIG. 3 is a perspective view of a second embodiment of an actuator system having an external rotor motor, a drive shaft and a drive train.

FIG. 3 shows an actuator system 20' which includes the external rotor motor 22, a drive train 24', the drive shaft 26 and the chassis 28. The external rotor motor 22 includes the external rotor 30, the internal stator 32 and the motor pin 34. The drive train 24' includes a crank arm 46, a drag link 42, and a drag link pin 44.

As seen in FIG. 3, the external rotor motor 22 is attached to the chassis 28 in the same way as was described with regard to actuator system 20 containing the single link 2D drive train 24 (as seen in FIG. 1). Likewise, the drive shaft 26 is similarly restrained with the exception of rotation as was described with regard to actuator system 20 containing the single link 2D drive train 24 (as seen in FIG. 1).

The second embodiment of the actuator system 20' utilizes a double link 2D version of the drive train 24'. The drive train 24' is a double link version, because it uses two links (the crank arm 46 and the drag link 42). The drive train 24' is considered 2D because the motion of the links (e.g., crank arm 46 and drag link 42) is restricted to a 2D plane (e.g., Y-Z plane).

As seen in FIG. 3, the motor pin 34 extends from some radius of the end surface of the external rotor 30 (the end surface is the only portion of the external rotor 30 depicted in a plane perpendicular to the X direction). The motor pin 34 interacts with the drive train 24'. The double link 2D version of the drive train 24' incorporates the crank arm 46, the drag link 42, and the drag link pin 44 to transmit rotation of the external rotor 30 to the drive shaft 26. The motor pin 34 connects to one end of the drag link 42 (i.e. the drag link 42 is pinned to the external rotor 30). One end of the crank arm 46 connects to the other end of the drag link 42 using the drag link pin 44 (i.e. the crank arm 46 is pinned to the drag link 42). The drive shaft 26 affixes to the other end of the crank arm 46. As will be discussed in further detail below with reference to FIG. 4, this double link 2D version of the drive train 24 transmits a portion of the motor's 22 rotation to the drive shaft 26 in the same plane and perpendicular to the X direction.

Figure 4A:
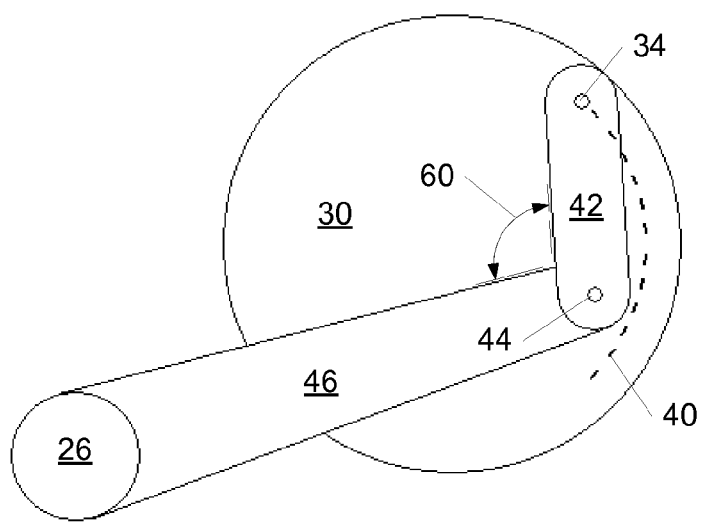
FIGS. 4A, 4B, and 4C are side views of the actuator system of FIG. 3.
Figure 4B:
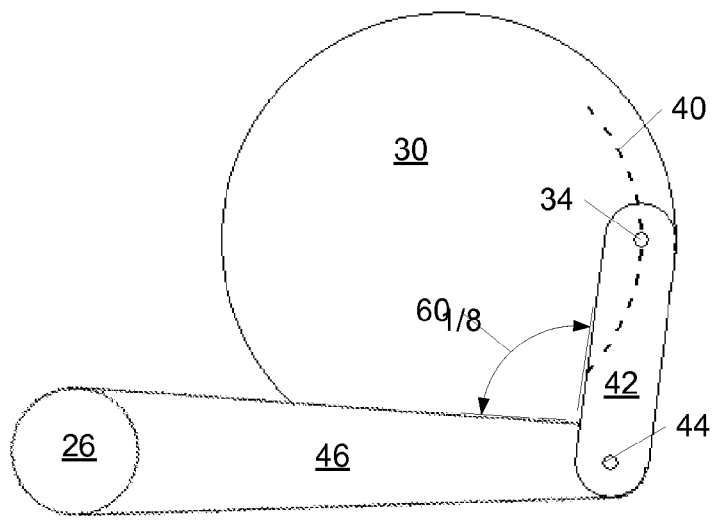
Figure 4C:
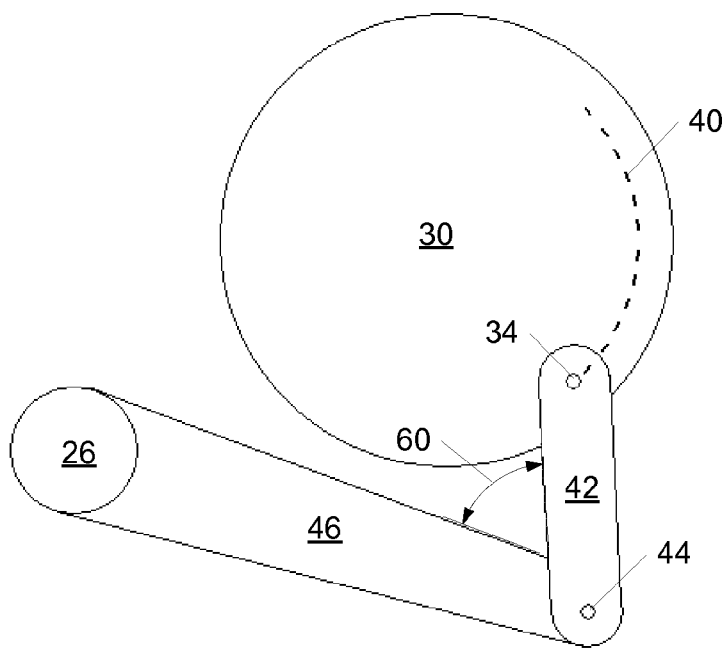

FIG. 4A shows the external rotor 30 with the motor pin 34 in the maximum counterclockwise position (maximum Z position of FIG. 4A, B, or C) and shows the range of motion 40 of the motor pin 34. FIG. 4B shows the external rotor 30 with the motor pin 34 in the midrange position (intermediate Z position of FIG. 4A, B, or C) and shows the range of motion 40 of the motor pin 34. FIG. 4C shows the external rotor 30 with the motor pin 34 in the maximum clockwise position (minimum Z position of FIG. 4A, B, or C) and shows the range of motion 40 of the motor pin 34.

Because the external rotor 30 and the drive shaft 26 are restrained except with respect to rotation about axes in the X direction, as the motor pin 34 moves about the first axis of rotation 56, the drag link 42 moves through the Z direction and the end of the crank arm 46 not attached to the drive shaft 26 is swept through the Z direction. The motion of the crank arm 46 applies a torque to the drive shaft 26, causing the drive shaft 26 to rotate. The angle 60 between the drag link 42 and the crank arm 46 will change during the external motor rotor 22 rotation. Consequently, the motion of the drive shaft 26 is driven predominantly by displacement of the motor pin 34 in the Z direction. An angular change in the external rotor 30 will result in an angular change in the drive shaft 26. This drive train 24' configuration allows for small displacements of both the motor pin 34 and the drag link pin 44 while transferring the predominant motion in the Z direction. The mechanical advantage of this configuration is proportional to the change in the angle of the external rotor 30 about the first axis of rotation 56 relative to the change in the angle of the drive shaft 26 about the second axis of rotation 58. This mechanical advantage will be a function of the relative positions of the external rotor motor 22 and the drive shaft 26, the lengths of the crank arm 46 and the drag link 42, and the position of the motor pin 34.

As seen in FIG. 4A, since the motor pin 34 is in the maximum counterclockwise position of its range of motion 40, the motor pin 34 is at a maximum distance from the drive shaft 26, resulting in a maximum angle 60 between the drag link 42 and the crank arm 46. As the motor pin 34 moves in the clockwise direction with respect to the first axis of rotation 56 to the midpoint position of the range of motion 40, as seen in FIG. 4B, the drag link 42 pushes the end of the crank arm 46 in the negative Z direction and the distance between the motor pin 34 and the drive shaft 26 is reduced. The reduction in distance results in a reduction of the angle 60 between the drag link 42 and the crank arm 46. Finally, as the motor pin 34 moves in the clockwise direction to the maximum clockwise position of the range of motion 40, as seen in FIG. 4C, the drag link 42 pushes the end of the crank arm 36 further in the negative Z direction and the distance between the motor pin 34 and the drive shaft 26 is reduced even further. The reduction in distance results in further reduction of the angle 60 between the drag link 42 and the crank arm 46.

Figure 5:
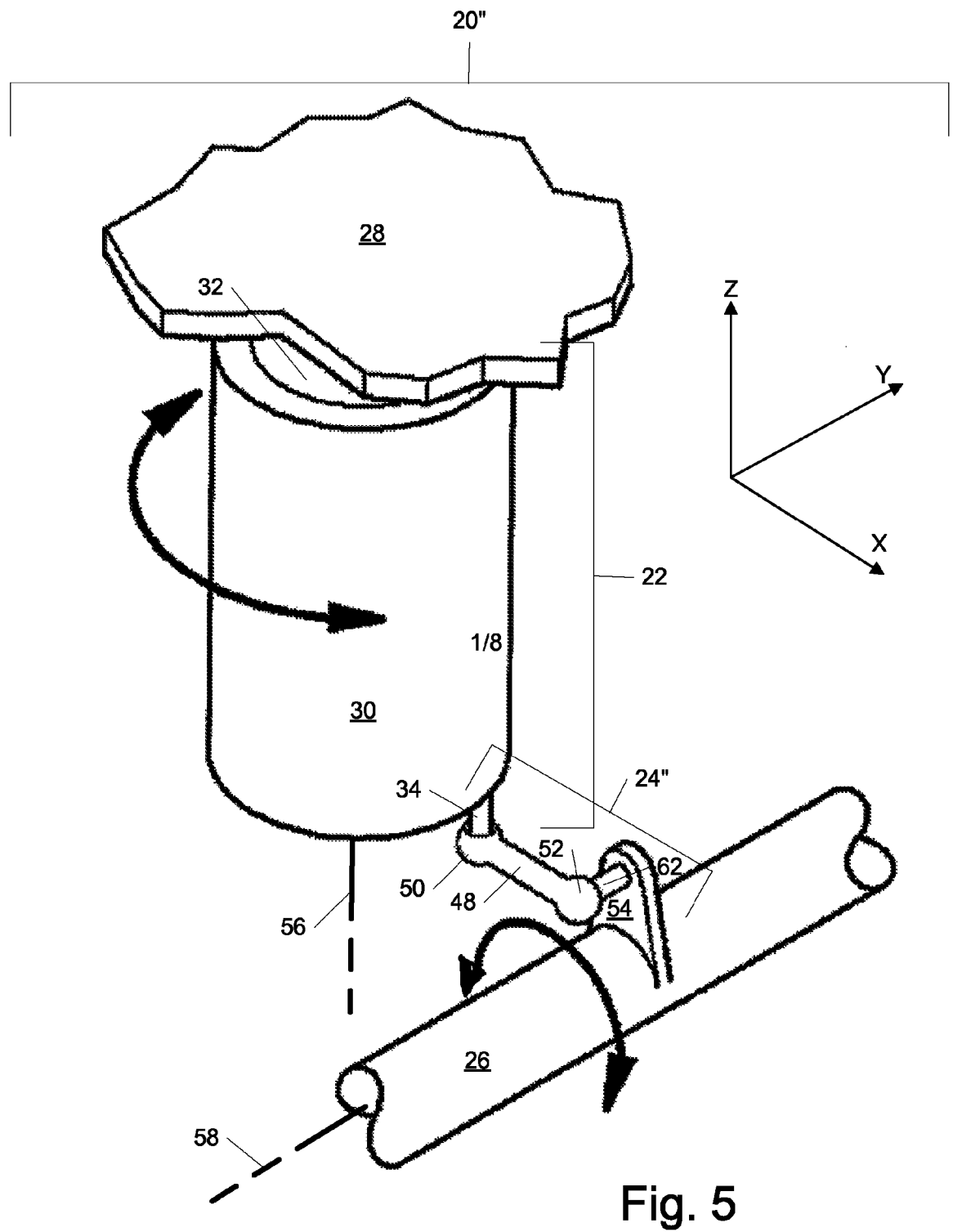
FIG. 5 is a perspective view of a third embodiment of an actuator system having an external rotor motor, a drive shaft and a drive train.

FIG. 5 shows an actuator system 20" which includes the external rotor motor 22, a drive train 24", the drive shaft 26 and the chassis 28. The external rotor motor includes the external rotor 30, the internal stator 32 and the motor pin 34. The drive train 24" includes a crank arm 54, a drag link 48, a drag link pin 62, a first ball socket joint 50, and a second ball socket joint 52.

As seen in FIG. 5, the external rotor motor 22 is rigidly attached to the chassis 28 (e.g., structural member of a missile) in the X-Y plane. This rigid attachment is made to the stationary internal stator 32 of the external rotor motor 22. The external rotor 30 of the external rotor motor 22 rotates freely with respect to the chassis 28 along a first axis of rotation 56 which is parallel to the Z axis. The rotation of the external rotor 30 is restricted to a limited angle rotation (e.g. less than 90 degrees). Due to the external rotor's 30 limited rotation, commutation is not required to control operation of the motor.

The drive shaft 26 rotates about the second axis of rotation 58 that is parallel to the Y axis. Other than this rotation, the drive shaft 26 motion is restrained. The rotation of the drive shaft 26 provides motion for other external devices (e.g., fins of a missile).

The third embodiment of the actuator system 20" utilizes a double link, three dimensional (3D) version of the drive train 24". The drive train 24" is a double link version, because it uses two links (the crank arm 54 and the drag link 48). The drive train 24" is considered 3D because the motion of at least one of the links (e.g., drag link 48) is free to move in three dimensions.

As seen in FIG. 5, the motor pin 34 extends from the end surface of the external rotor 30 (the end surface is the only portion of the external rotor 30 depicted in the X-Y plane). The motor pin interacts with the drive train 24". The double link 3D version of the drive train 24" incorporates the crank arm 54, the drag link 48, the drag link pin 62, the first ball socket joint 50, and the second ball socket joint 52 to transmit rotation of the external rotor 30 to the drive shaft 26. The motor pin 34 connects to one end of the drag link 48 at the first ball socket joint 50. The first ball socket joint 50 is a joint capable of rotation about the Y direction and the Z direction. One end of the crank arm 54 connects to the other end of the drag link 48 using the second ball socket joint 52. The second ball socket joint 52 is also a joint capable of rotation about the Y direction and the Z direction. The drive shaft 26 attaches to the other end of the crank arm 54. As will be discussed in further detail below with reference to FIG. 6, this double link 3D version of the drive train 24 transmits a portion of the motor's 22 rotation to the drive shaft 26 in a different plane and in a different direction.

Figure 6A:
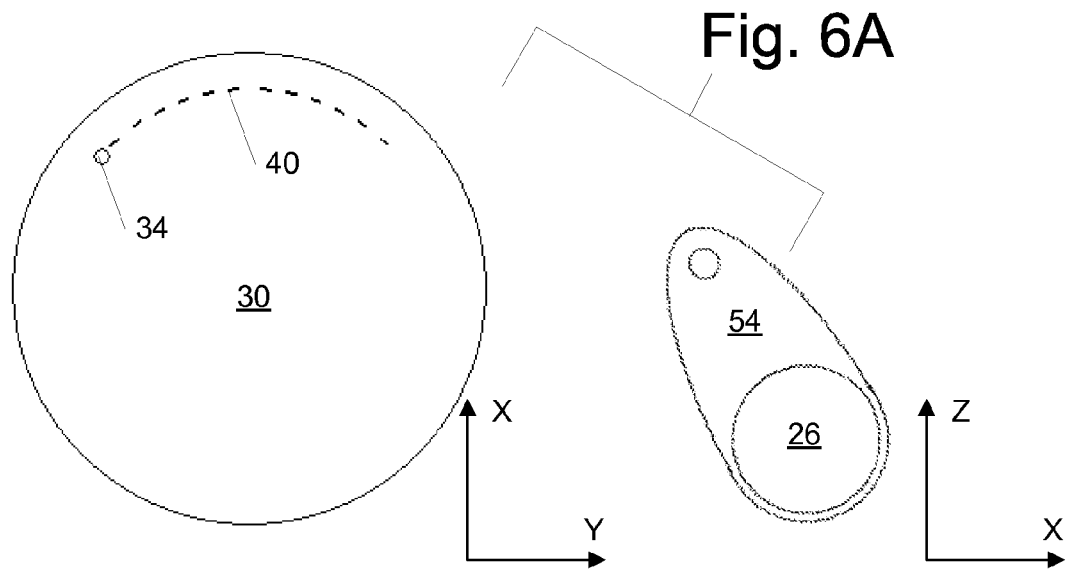
FIGS. 6A, 6B, and 6C are side views of the actuator system of FIG. 5.
Figure 6B:
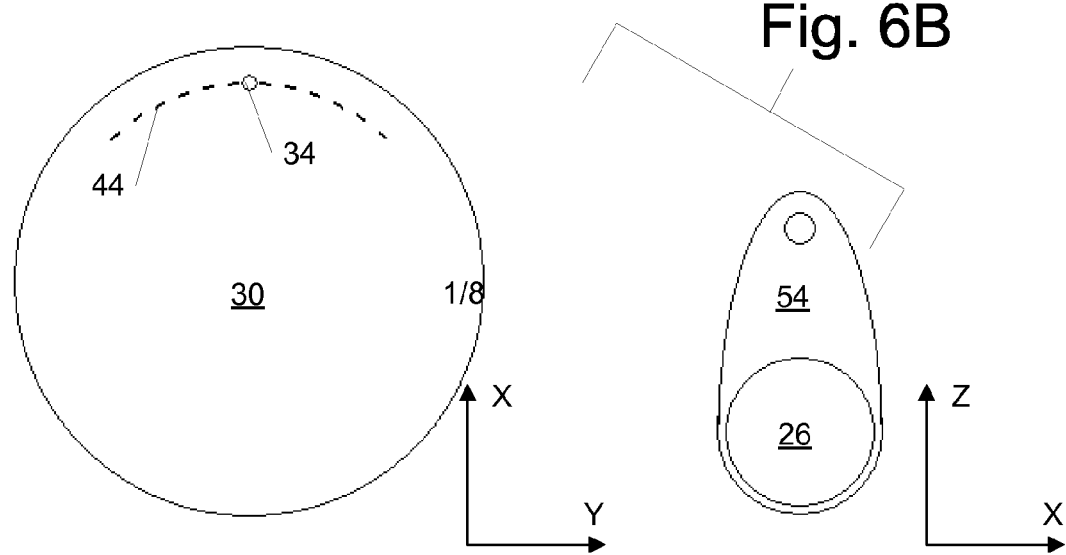
Figure 6C:
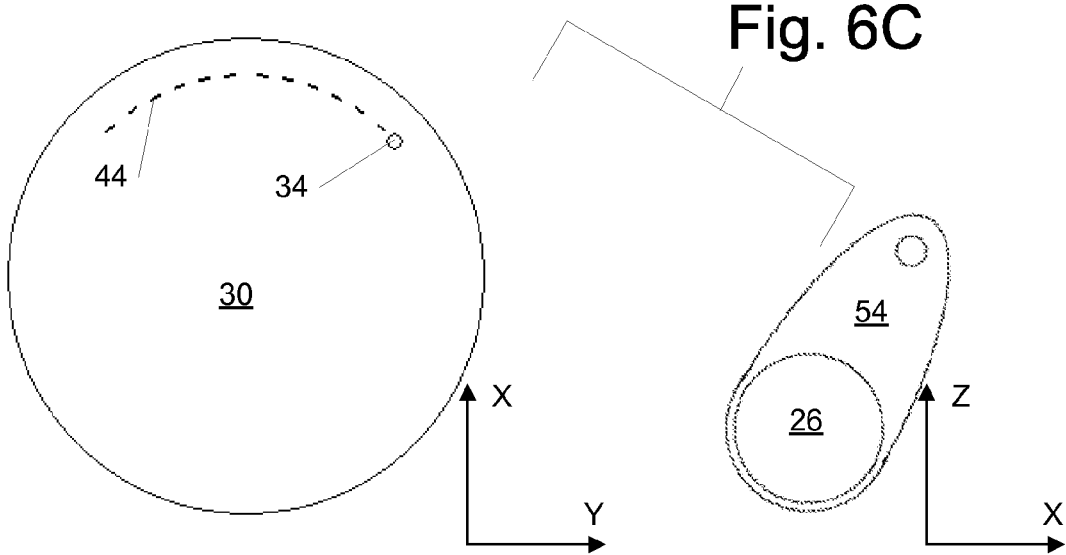

FIG. 6A shows the external rotor 30 in the X-Y plane with the motor pin 34 in the maximum counterclockwise position (minimum Y position of FIG. 6A, B, or C) and shows the range of motion 40 of the motor pin 34. FIG. 6A also shows the drive shaft 26 in the X-Z plane with the crank arm 54 in the maximum counterclockwise position (minimum X position of FIG. 6A, B, or C). FIG. 6B shows the external rotor 30 in the X-Y plane with the motor pin 34 in the midpoint position (intermediate Y position of FIG. 6A, B, or C) and shows the range of motion 40 of the motor pin 34. FIG. 6B also shows the drive shaft 26 in the X-Z plane with the crank arm 54 in the midpoint position (intermediate X position of FIG. 6A, B, or C). FIG. 6C shows the external rotor 30 in the X-Y plane with the motor pin 34 in the maximum clockwise position (maximum Y position of FIG. 6A, B, or C) and shows the range of motion 40 of the motor pin 34. FIG. 6C also shows the drive shaft 26 in the X-Z plane with the crank arm 54 in the (maximum X position of FIG. 6A, B, or C).

Because the external rotor 30 and the drive shaft 26 are restrained except with respect to rotation, as the motor pin 34 moves about the first axis of rotation 56, the first ball socket joint 50 of drag link 48 is swept through an arc about the first axis of rotation 56 and thus drives the drag link 48 so that the second ball socket 52 and the end of the crank arm 54 not attached to the drive shaft 26 is sweep through an arc about the second axis of rotation 58. The motion of the crank arm 54 applies a torque to the drive shaft 26, causing the drive shaft 26 to have angular movement. Thus the angular displacement of the motor pin 34 about the first axis of rotation 56 transmits torque and angular displacement to the drive shaft 26 about the second axis of rotation 58. An angular change in the external rotor 30 will result in an angular change in the drive shaft 26. The change in the angle of the drive shaft 26 about the second axis of rotation 58 will be less than the change in the angle of the external rotor 30 about the first axis of rotation 56, and the difference of angular displacement will be a function of the relative geometric positions of the external rotor motor 22 and the drive shaft 26, and the length of the crank arm 54 and drag link 48.

As seen in FIG. 6A, since the motor pin 34 is in the maximum counterclockwise position of its range of motion 40, the motor pin 34 is at a maximum distance from the drive shaft 26 and the end of crank arm 54 not attached to the drive shaft 26 is in its maximum counterclockwise position. As the motor pin 34 moves in the clockwise direction with respect to the first axis of rotation 56 to the midpoint position of the range of motion 40, as seen in FIG. 6B, the drag link 48 pushes the end of the crank arm 54 in the clockwise direction and the distance between the motor pin 34 and the drive shaft 26 is reduced. Finally, as the motor pin 34 moves in the clockwise direction to the maximum clockwise position of the range of motion 40, as seen in FIG. 6C, the drag link 48 pushes the end of the crank arm 54 further in the clockwise direction and the distance between the motor pin 34 and the drive shaft 26 is reduced even further.

Figure 7:
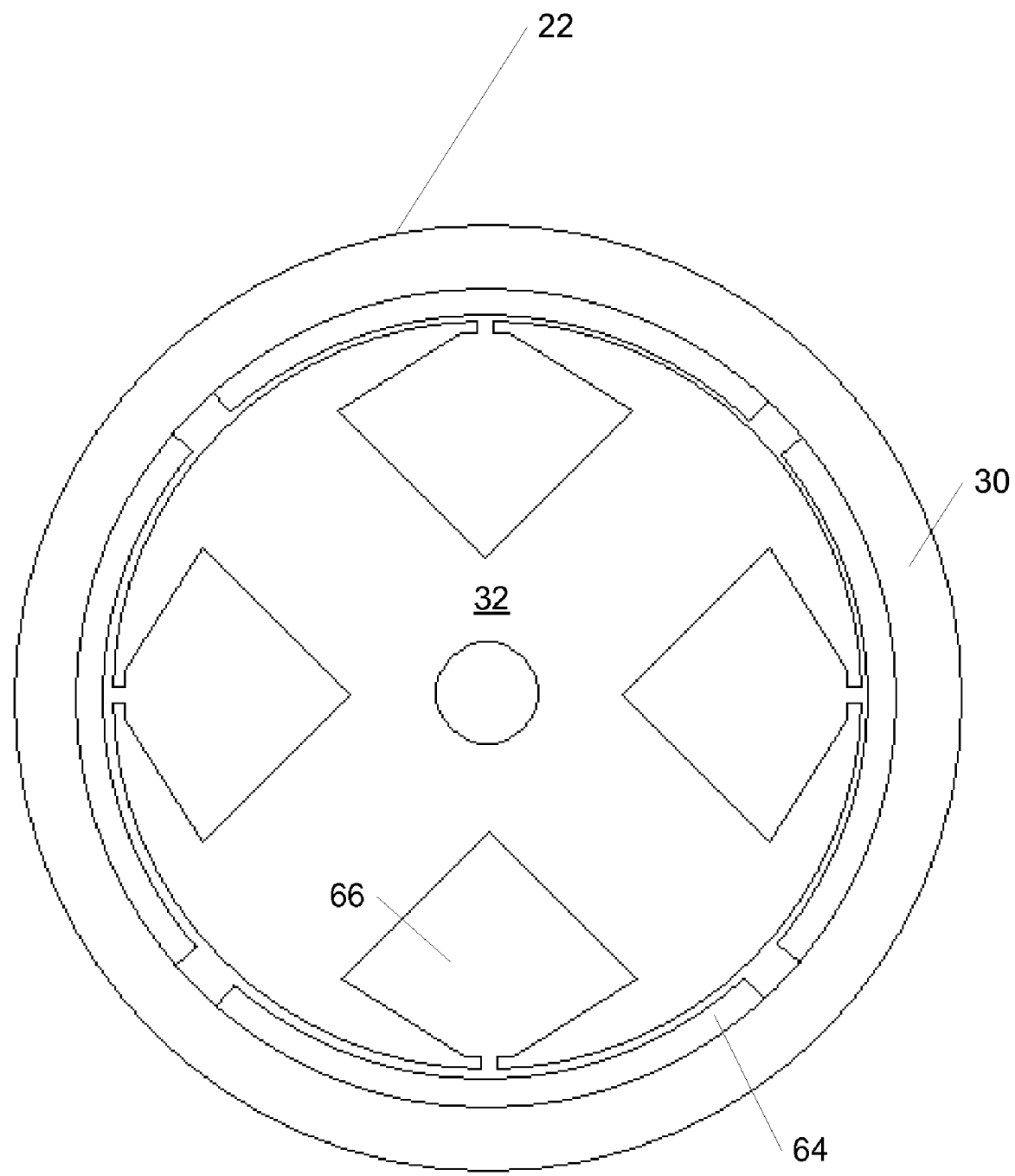
FIG. 7 is a cross section of the external rotor motor of FIG. 1.

FIG. 7 shows the external rotor motor 22 which includes the external rotor 30, the internal stator 32, a set of poles 64 (i.e., four or more poles 64), and a set of slots 66 (i.e., four or more slots 66). The stator windings have been omitted for clarity.

As shown in FIG. 7 one possible configuration for the external rotor motor 22 is the brushless DC external rotor motor 22. The brushless DC external rotor motor 22 is a four pole motor 22 that can rotate in both directions. The external rotor 30 has limited rotation (e.g., less than 90 degrees). Because of the limited rotation no commutation is required. Thus only two switches (e.g. field effect transistors) may be required to operate the motor 22 (as opposed to six switches typically required for typical brushless motors). This results in a less complicated, less expensive, and more compact motor 22.

Figure 8:
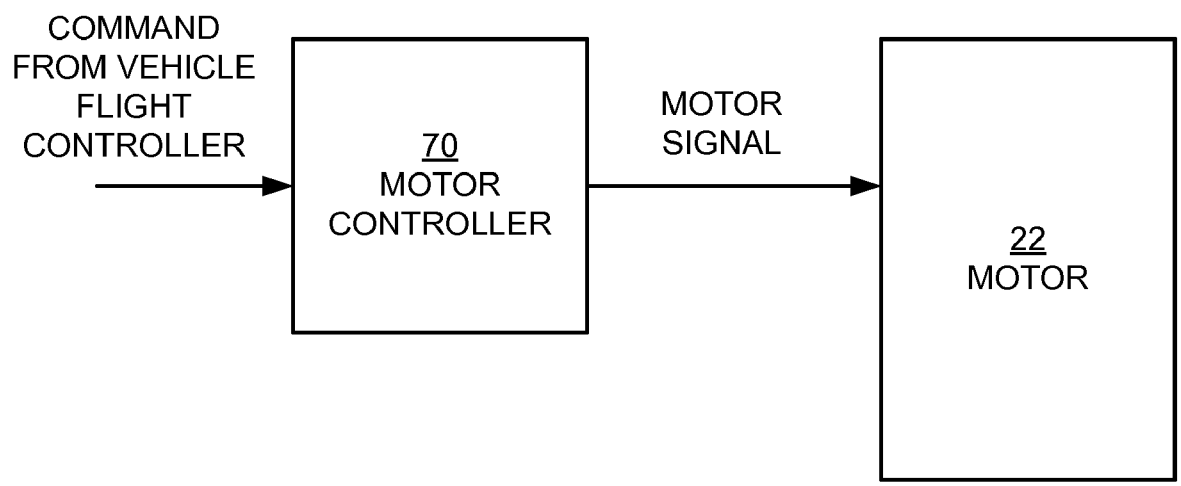
FIG. 8 is a block diagram showing a motor controller.

FIG. 8 shows a system having a motor controller 70 which accepts a command (e.g. an electronic signal) from a vehicle flight controller and converts that to the requisite motor signal to drive the external rotor motor 22.

While various embodiments of the invention have been particularly shown and described, it will be understood by those skilled in the art that various changes in form and details may be made therein without departing from the spirit and scope of the invention as defined by the appended claims.

For example, the external rotor motor 22 can have more than four poles 64 and four slots 66 as long as the number of poles 64 and slots 66 are the same to ensure limited rotation.

What is claimed is:

1. An actuator system comprising:
    an external rotor motor having:
        an internal armature configured as a stator having a set of coils wrapped around a set of arms, and
        an external permanent magnet rotor having a set of poles configured to rotate less than 90 degrees around the stator;
    a drive shaft configured to be rotated by the external rotor motor; and
    a drive train connecting the external permanent magnet rotor to the drive shaft, and configured to allow transmission of a first component of rotational motion from the external permanent magnet rotor to the drive shaft and to prevent transmission of a second component of rotational motion from the external permanent magnet rotor to the drive shaft.

2. The actuator system of claim 1 wherein the first component of rotational motion is perpendicular to the second component of rotational motion; and
    wherein the drive train comprises a crank arm connected to the external permanent magnet rotor at a motor pin on the external rotor motor, the crank arm defining an elongated crank arm slot configured to have a width substantially that of a diameter of the motor pin in the direction of the first component of rotational motion, and to have a length substantially larger than the diameter of the motor pin in the direction of the second component of rotational motion.

3. The actuator system of claim 2 wherein the first component of rotational motion is perpendicular to a length of the crank arm and is located at the motor pin.

4. The actuator system of claim 2 wherein the motor pin extends from an end surface of the external permanent magnet rotor away from an axis of rotation of the external rotor motor.

5. The actuator system of claim 1 wherein the first component of rotational motion is perpendicular to the second component of rotational motion; and
    wherein the drive train comprises:
        a drag link pinned to the external permanent magnet rotor; and
        a crank arm pinned to the drag link, wherein an angle between the drag link and the crank arm changes as the external permanent magnet rotor rotates.

6. The actuator system of claim 5 wherein angular displacement of the drive shaft about a second axis of rotation will be less than angular displacement the external rotor 30 about a first axis of rotation creating a difference of angular displacement, the difference of angular displacement being a function of relative geometric positions of the external rotor motor, the drive shaft, and the motor pin, and length of the crank arm and drag link.

7. The actuator system of claim 1 wherein the drive train comprises:
    a crank arm attached to the drive shaft; and
    a drag link forming a first ball-socket joint with the external permanent magnet rotor and a second ball-socket joint with the crank arm, wherein the first ball-socket joint, the second ball-socket joint, and the crank arm are configured to allow transmission of rotational motion from the external permanent magnet rotor to the drive shaft, and wherein the external permanent magnet rotor and the drive shaft have non-parallel axes of rotation.

8. The actuator system of claim 7 wherein angular displacement of the drive shaft about a second axis of rotation will be less than angular displacement the external rotor 30 about a first axis of rotation creating a difference of angular displacement, the difference of angular displacement being a function of relative geometric positions of the external rotor motor and the drive shaft, and length of the crank arm and drag link.

9. The actuator system of claim 1 wherein the internal armature has only four (4) windings and the external permanent magnet rotor has only four (4) poles.

10. The actuator system of claim 1 wherein the drive shaft has a fixed translational position relative to the external rotor motor and is configured to be rotated by the external rotor motor about a fixed axis of rotation extending through the drive shaft.

11. The actuator system of claim 10 wherein the drive train includes an elongated crank arm affixed at one end to the drive shaft and extending away from the drive shaft in a direction perpendicular to the fixed axis of rotation, and wherein the drive train is configured to pivot the crank arm about the fixed axis of rotation to effect rotation of the drive shaft.

12. The actuator system of claim 11 wherein the crank arm includes an elongated slot extending in the direction perpendicular to the fixed axis of rotation, and wherein the external rotor motor includes a pin extending through the slot from an end surface of the external permanent magnet rotor to effect the transmission of the first component of rotational motion while preventing transmission of the second component of rotation motion.

13. A missile, comprising:
a chassis;
one or more fins configured for rotational motion to steer the missile in flight; and
the actuator system of claim 1, wherein the internal armature of the external rotor motor is rigidly attached to the chassis, and wherein the drive shaft is coupled to the fins to provide the rotational motion of the fins by the rotation of the drive shaft.

14. The missile of claim 13 wherein the fins are directly attached to the drive shaft.

15. A vehicle, comprising:
the actuator system of claim 1, configured and operative in response to a motor signal to effect a corresponding mechanical flight control action;
a motor controller operative to generate the motor signal in response to a command; and
a vehicle flight controller operative to generate the command to effect control of flight of the vehicle.

* * * * *